(12) United States Patent
Okahara (10) Patent No.: US 10,960,774 B2
(45) Date of Patent: Mar. 30, 2021

(54) AUTOMATIC TRAIN OPERATION DEVICE

(71) Applicant: Mitsubishi Electric Corporation, Chiyoda-ku (JP)

(72) Inventor: Takuya Okahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 196 days.

(21) Appl. No.: 16/331,818

(22) PCT Filed: Nov. 6, 2017

(86) PCT No.: PCT/JP2017/039961
§ 371 (c)(1),
(2) Date: Mar. 8, 2019

(87) PCT Pub. No.: WO2018/088366
PCT Pub. Date: May 17, 2018

(65) Prior Publication Data
US 2019/0255956 A1 Aug. 22, 2019

(30) Foreign Application Priority Data
Nov. 10, 2016 (JP) .............................. JP2016-219977

(51) Int. Cl.
*B60L 15/40* (2006.01)
*B61L 25/02* (2006.01)
(Continued)

(52) U.S. Cl.
CPC .............. *B60L 15/40* (2013.01); *B61L 3/002* (2013.01); *B61L 3/006* (2013.01); *B61L 3/008* (2013.01);
(Continued)

(58) Field of Classification Search
CPC .... B60L 15/40; B60L 25/021; B60L 27/0038; B60L 3/002; B60L 3/006; B60L 3/008; B60L 2200/26; B60L 2027/005
See application file for complete search history.

(56) References Cited

U.S. PATENT DOCUMENTS 4,384,695 A * 5/1983 Nohmi ..................... B61L 3/12
246/182 B
4,852,007 A 7/1989 Yasunobu et al.
(Continued)

FOREIGN PATENT DOCUMENTS

GB 2474934 A 5/2011
JP 58-190204 A 11/1983
(Continued)

OTHER PUBLICATIONS

International Search Report dated Jan. 30, 2018 in PCT/JP2017/039961 filed Nov. 6, 2017.

*Primary Examiner* — Michael J Zanelli
(74) *Attorney, Agent, or Firm* — Xsensus LLP (57) ABSTRACT

An automatic train operation device includes: a step command start position determining unit to determine whether a train passes through a step command start position that is a position a certain distance before a target stop position of the train; a deceleration command generating unit to generate a deceleration command to control braking force of a braking device in a section from the step command start position that the train passes through to the target stop position at which the train stops; and a travel history storage unit to store travel state information and the deceleration command for the section as a plurality of travel histories. When the step command start position is determined by the step command start position determining unit, the deceleration command generating unit generates the deceleration command by using the travel histories.

8 Claims, 9 Drawing Sheets

(51) Int. Cl.
   *B61L 27/00* (2006.01)
   *B61L 3/00* (2006.01)
(52) U.S. Cl.
   CPC ......... *B61L 25/021* (2013.01); *B61L 27/0038* (2013.01); *B60L 2200/26* (2013.01); *B61L 2027/005* (2013.01)

(56) References Cited

U.S. PATENT DOCUMENTS

| | | | |
|---|---|---|---|
| 5,018,689 A | | 5/1991 | Yasunobu et al. |
| 8,370,008 B2 * | | 2/2013 | Yamamoto ............ B61L 25/026 701/20 |
| 10,093,331 B2 * | | 10/2018 | Danielson ........... B61L 27/0027 |
| 2012/0197466 A1 * | | 8/2012 | Yoshimoto .............. B61L 27/04 701/20 |
| 2017/0305396 A1 | | 10/2017 | Shiratsuchi |

FOREIGN PATENT DOCUMENTS

| | | | |
|---|---|---|---|
| JP | 2006-74876 A | | 3/2006 |
| JP | 2008-278645 A | | 11/2008 |
| JP | 2009-27784 | * | 2/2009 |
| JP | 2011-87364 A | | 4/2011 |
| WO | WO 2016/035597 A1 | | 3/2016 |

* cited by examiner

|  | INITIAL | FIRST | SECOND | THIRD |
|---|---|---|---|---|
| DISTANCE AT TIME OF STEP COMMAND START DETERMINATION (m) | -3.00 | -2.95 | -2.93 | -2.97 |
| VELOCITY AT TIME OF STEP COMMAND START DETERMINATION (km/h) | 7.0 | 6.9 | 7.1 | 6.9 |
| ACCELERATION AT TIME OF STEP COMMAND START DETERMINATION (km/h/s) | -2.3 | -2.25 | -2.37 | -2.22 |
| DECELERATION COMMAND VALUE | (10, 8, 6) | (10, 8, 6) | (10, 8, 6) | |
| DECELERATION COMMAND VALUE SWITCHING DISTANCE (m) | (-2.0, -1.0, -0.5) | (-2.1, -1.1, -0.6) | (-1.9, -0.9, -0.7) | |
| DECELERATION COMMAND VALUE SWITCHING VELOCITY (m/s) | (5.0, 2.9, 1.4) | (5.1, 2.8, 1.2) | (5.2, 2.9, 1.3) | |
| STOP POSITION ERROR (m) | 0 | -0.18 | -0.15 | |

AUTOMATIC TRAIN OPERATION DEVICE

FIELD

The present invention relates to an automatic train operation device.

BACKGROUND

Conventional automatic train operation devices detect the current train velocity with a velocity generator for detecting a train wheel's rotational velocity and then calculate the train's current position by integrating the train velocity. Controlling a train such that it automatically stops at a target stop position is called fixed position stop control. A conventional automatic train operation device generates a target velocity pattern that enables stopping at the target stop position with a target deceleration on the basis of the remaining travel distance to the target stop position calculated by using the current train position and the current train velocity. The conventional automatic train operation device then outputs a drive control command and a braking control command, which are discrete command values, in order to cause the current train velocity to follow the target velocity pattern. The drive control command and braking control command are referred to as notch commands. A conventional automatic train operation device adjusts the braking control command on the basis of evaluation items, for example, stopping accuracy at the target stop position, ride comfort during the stop control, and punctuality until the train stops. However, a conventional automatic train operation device has a disadvantage in that, when the ability to follow the target velocity pattern is enhanced to ensure stopping accuracy and punctuality, the number of switchings of the notch command increases, which deteriorates the ride comfort.

Patent Literature 1 proposes a method for stopping at a fixed position that ensures stopping accuracy while inhibiting the number of notch switchings to no more than necessary by using fuzzy control to determine whether to switch the notch command.

CITATION LIST

Patent Literature

Patent Literature 1: Japanese Patent Application Laid-open No. S58-190204

SUMMARY

Technical Problem

The method for stopping at a fixed position disclosed in Patent Literature 1 has a problem in that adjusting fuzzy control rules is complicated, trial and error and know-how are necessary for the adjustment, and the number of labor-hours needed for making an adjustment to modify the stopping accuracy is increased.

The present invention has been made in view of the above, and an object thereof is to obtain an automatic train operation device capable of reducing the number of labor-hours needed for making an adjustment to modify stopping accuracy.

Solution to Problem

To solve the aforementioned problems and achieve the object, an automatic train operation device according to as aspect of the present invention is an automatic train operation device for performing stop control on a train, including: a determining unit to determine whether the train passes through a step command start position that is a position a certain distance before a target stop position of the train; a deceleration command generating unit to generate a deceleration command to control a braking force of the train in a section from the step command start position that the train passes through to the target stop position at which the train stops; and a travel history storage unit to store a travel state of the train and the deceleration command for the section as a plurality of travel histories, wherein, when the step command start position is determined by the determining unit, the deceleration command generating unit generates the deceleration command by using the travel histories stored in the travel history storage unit.

Advantageous Effects of Invention

According to the present invention, an effect of reducing the number of labor-hours needed for making an adjustment to modify stopping accuracy can be obtained.

DESCRIPTION OF EMBODIMENTS

An automatic train operation device according to embodiments of the present invention will be described in detail below with reference to the drawings. It should be noted that the present invention is not limited by the embodiments.

First Embodiment

Figure 1:
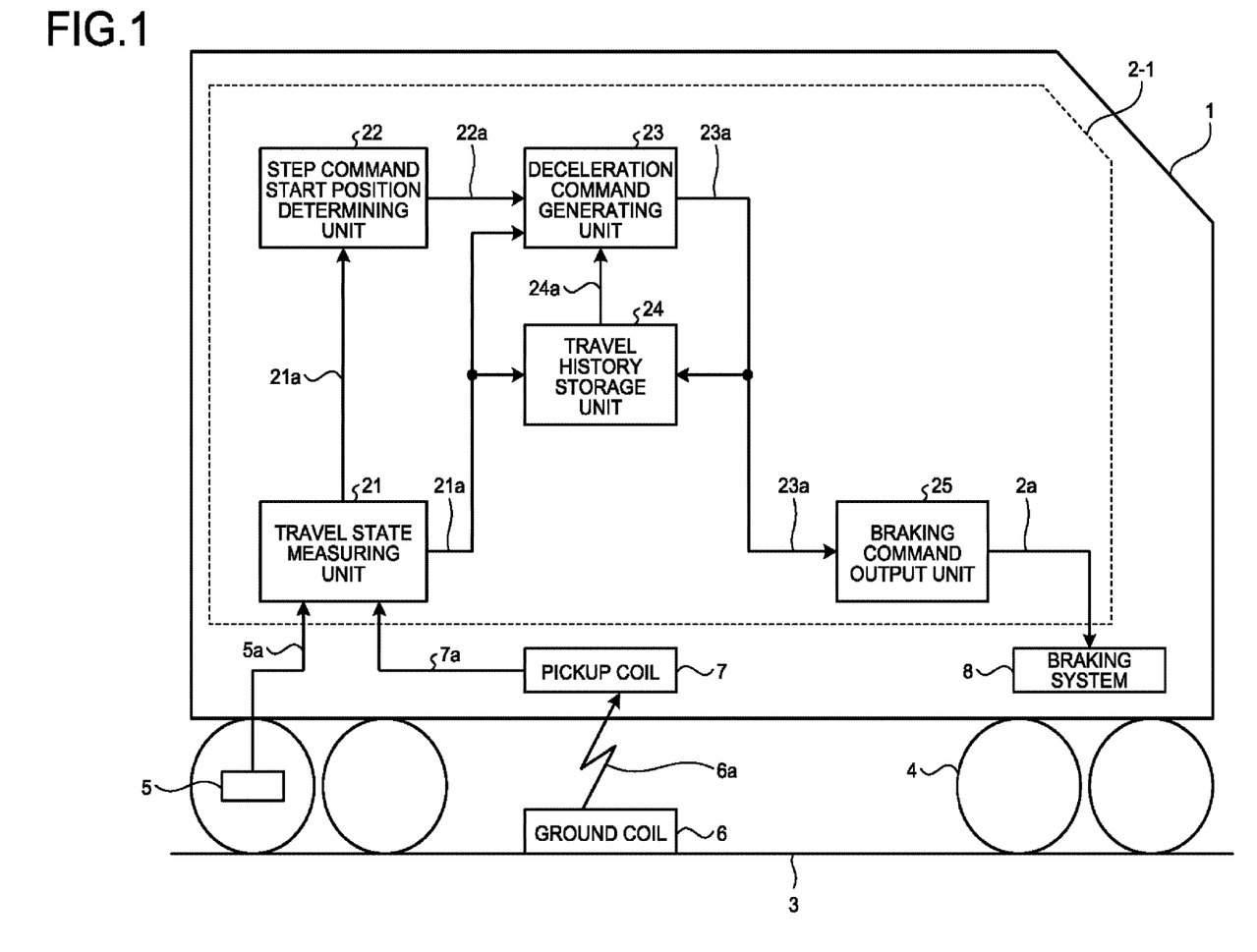
FIG. 1 is a diagram schematically illustrating a train car on which an automatic train operation device according to a first embodiment of the present invention is mounted.

FIG. 1 is a diagram schematically illustrating a train car on which an automatic train operation device 2-1 according to a first embodiment of the present invention is mounted. A car 1 illustrated in FIG. 1 represents one car of a plurality of cars constituting a train. The car 1 includes the automatic train operation device 2-1 according to the first embodiment of the present invention and a plurality of wheels 4. The wheels 4 are attached to axles that extend from a gear device (not illustrated) and transmit a driving force to a rail 3. The car 1 includes a velocity sensor 5, a pickup coil 7, and a braking device 8. The velocity sensor 5 is a wheel-rotation-angular-velocity sensor that is attached to at least one of the wheels 4, and it detects the angular velocity of rotation of the wheel 4 to output velocity information 5a, which is information on the angular velocity of rotation. The braking device 8 generates a braking force against the wheels 4. The car 1 includes a propulsion device (not illustrated) that generates propulsion for the wheels 4.

Examples of the velocity sensor 5 can include a velocity generator that generates voltages having a frequency proportional to the train velocity, e.g., 1500 [Hz] for the train velocity of 50 [km/h] and 2000 [Hz] for the train velocity of 100 [km/h]. The pickup coil 7 includes primary and secondary side coils (not illustrated) magnetically coupled to each other. The pickup coil 7 detects the position of a ground coil 6 by detecting the resonance frequency of a resonance circuit (not illustrated) provided in the ground coil 6 by using ground coil information 6a output from the ground coil 6, which is installed near the rail 3 and magnetically coupled to the rail 3. The pickup coil 7 then outputs the positional information as ground coil detection information 7a.

The automatic train operation device 2-1 receives the velocity information 5a and the ground coil detection information 7a. The automatic train operation device 2-1 outputs a braking command 2a to the braking device 8 and outputs a drive command to the propulsion device (not illustrated).

The configuration of the automatic train operation device 2-1 will be described below.

The automatic train operation device 2-1 includes a travel state measuring unit 21 that measures and outputs travel state information 21a. The travel state measuring unit 21 measures, by using the velocity information 5a on the wheel 4 and the ground coil detection information 7a, the train position, train velocity, and train acceleration as information indicating the travel state of a train. The train position the current train on-rail position. The train velocity the current train velocity. The train acceleration is the current train acceleration. The travel state measuring unit 21 outputs the information as the travel state information 21a.

The travel state measuring unit 21 calculates the train velocity with reference to the value the wheel diameter and the velocity information 5a. The value of the wheel diameter is measured on the wheel 4 that has been machined during a periodic inspection of the car 1. The value may be manually set in the travel state measuring unit 21, or it may be obtained by automatically acquiring wheel diameter information output from a device external to the automatic train operation device 2-1. Examples of the external device can include a train information managing device (not illustrated) mounted on the car 1. The automatic acquisition of wheel diameter information enables reduction of work of inputting wheel diameters.

The travel state measuring unit 21 also calculates the train position by integrating the calculated train velocities. It should be noted that, in the calculation of the train velocity, a low-pass filter is preferably used for removing noise contained in the velocity information 5a. This improves the accuracy with which the train velocity and train position are detected.

The automatic train operation device 2-1 also includes a step command start position determining unit 22 The step command start position determining unit 22 is a determining unit that determines whether a train has passed through a step command start position, and, in the case where the train has passed through the step command start position, outputs position passage information 22a indicating that the train has passed through the step command start position. Determining whether a train has passed through a step command start position is referred to as "determination of a step command start position" or "passage determination of a step command start position". The step command start position is a position a certain distance before a target stop position, and it is preset by the step command start position determining unit 22.

Figure 2:
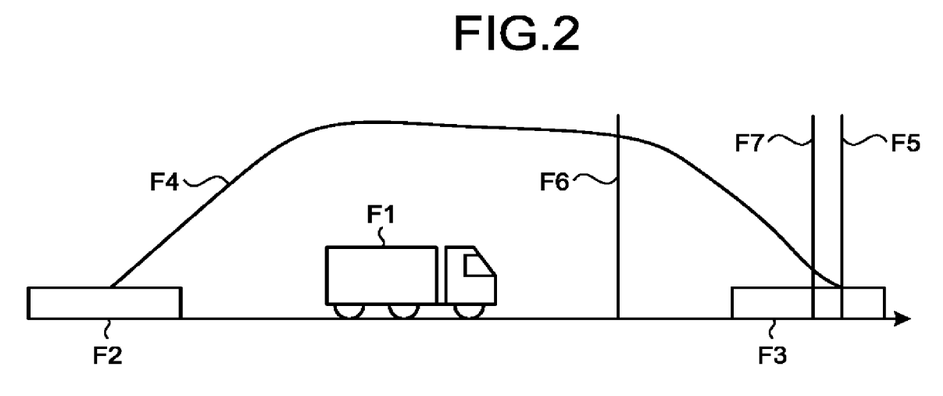
FIG. 2 is a diagram illustrating a step command start position during train control performed by the automatic train operation device illustrated in FIG. 1.

FIG. 2 is a diagram illustrating the step command start position during train control performed by the automatic train operation device 2-1 illustrated in FIG. 1. In FIG. 2, the automatic train operation device 2-1 controls a propulsion device and a braking device by performing acceleration control and constant velocity control after a train F1 leaves a predetermined station F2 and the control is such that the velocity of the train F1 follows a set target velocity F. In the case where the train F1 leaves the predetermined station F2 for a next station F3 and the train F1 passes through a first ground coil, which is at a fixed position stop control start point. F6, the automatic train operation device 2-1 detects the position of the first ground coil and then starts deceleration for stopping the train F1 at the next station F3. When the train F1 approaches the next station F3, the control of the automatic train operation device 2-1 switches to the fixed position stop control for accurately stopping the train F1 at a target stop position F5.

The step command start position is set at position F7 closer to the target stop position F5 than the fixed position stop control start point F6. In the case where the train travels on the same line multiple times, the step command start position can be set at a position where the train has the same condition of one of the train position and the train velocity. In one example, the pickup coil 7 illustrated in FIG. 1 can detect the position of the ground coil 6 by using the ground coil information 6a output from the ground coil 6 in FIG. 1. The ground coil 6 is installed at a position closest to the target stop position F5 illustrated in FIG. 2. The pickup coil 7 can set the detected position of the ground coil 6 as the step command start position. Alternatively, a desired position before the target stop position F5 illustrated in FIG. 2 may be set as the step command start position. The term "before" means a backward direction when the advancing direction of the train F1 that leaves the predetermined station F2 for the next station F3 is defined as a forward direction. The desired position before the target stop position F5 is, for example, a position 3 [m] before the target stop position F5. Alternatively, a position at which the train velocity of the decelerating train drops below 10 [km/h] may be set as the step command start position.

The determination of the step command start position in the step command start position determining unit 22 performed with reference to the travel state information 21a output from the travel state measuring unit 21. As a specific example, when a train passes through ground coil 6 installed at a position a certain distance before the target stop position, the pickup coil 7 that has detected the position of the ground coil 6 outputs the ground coil detection information 7a containing positional information that indicates the remaining distance to the target stop position. The travel state measuring unit 21 measures the train on-rail position at the time of passage of the ground coil 6 and the train velocity at the time of passage of the ground coil 6 on the basis of the ground coil detection information 7a and the velocity information 5a. The travel state measuring unit 21 outputs the measured on-rail position and train velocity to the step command start position determining unit 22 as the travel state information 21a. The step command start position determining unit 22 to which the travel state information 21a is input measures a movement distance of the train from the position of the ground coil 6. When the measured movement distance reaches a certain value, the step command start position determining unit 22 determines that the train has passed through the step command start position.

It should be noted that a method of determining the step command start position in the step command start position determining unit 22 is not limited thereto. When the train moves between two stations, the travel state measuring unit 21 measures a movement distance of the train after the train leaves one station, and then it outputs the movement distance to the step command start position determining unit 22 as the travel state information 21a. The step command start position determining unit 22 may use a method that determines that the train has passed through the step command start position when the movement distance measured by the travel state measuring unit 21 reaches a certain value.

In addition, the automatic train operation device 2-1 includes a travel history storage unit 24 that stores a travel state and a deceleration command during a period from the start of deceleration to stopping at the target stop position of the train as a plurality of travel histories 24a. The automatic train operation device 2-1 also includes a deceleration command generating unit 23 and a braking command output unit 25. The deceleration command generating unit 23 generates a deceleration command 23a to control the braking force of the braking device 8. The braking command output unit 25 generates and outputs the braking command 2a to the braking device 8 according to the deceleration command 23a.

Examples of the travel history 24a stored in the travel history storage unit 24 can include the deceleration command 23a preset before trial traveling of the train, the deceleration commands 23a generated up until the previous time by the deceleration command generating unit 23 during the trial traveling of the train, and travel state information 21a generated up until the previous time by the travel state measuring unit 21 during the trial traveling of the train. The deceleration command 23a preset before trial traveling of the train is hereinafter referred to as "an initial deceleration command". In the present invention, however, the trial traveling is not limited only to a test traveling before bringing the train into operational service, but includes traveling during operational service. The trial traveling in the present invention means train traveling in which the train leaves from a predetermined position, approaches a target stop position, and stops at the target stop position. The target stop position is located ahead of the predetermined position in the advancing direction of the train. In addition, the trial traveling of the train up until the previous time can be paraphrased as past trial traveling of the train.

It should be noted that the travel state information 21a, which is a part of the travel history 24a recorded in the travel history storage unit 24, includes the train position and the train velocity. The train position and the train velocity are measured by the travel state measuring unit 21 during a period from when the train starts deceleration and to when the train stops at the target stop position as a result of a braking operation caused by the deceleration command 23a generated by the deceleration command generating unit 23 during each of a plurality of past trial travelings of the train.

Moreover, in the travel history storage unit 24, the travel state information 21a is associated with the deceleration command 23a generated during the trial traveling of the train. The travel state information 21a relates to the train position and the train velocity measured by the travel state measuring unit 21 during the trial traveling.

The deceleration command generating unit 23 generates the deceleration command 23a to decelerate the train in the section from the step command start position to the train stopping position on the basis of the current travel state information 21a, the position passage information 22a, and the travel history 24a output from the travel state measuring unit 21. The current travel state information 21a here means the travel state information 21a acquired during generation of the deceleration command 23a. The current travel state information 21a can be paraphrased as the travel state information 21a at this time. The current travel state information 21a can also be paraphrased as the chronologically latest travel state information 21a of a plurality of pieces of travel state information 21a generated by the travel state measuring unit 21.

A method of generating the deceleration command 23a in the deceleration command generating unit 23 will be described in detail below.

A plurality of initial deceleration commands are prepared beforehand according to the travel state at the time when the train passes through the step command start position. Specifically, the initial deceleration commands are generated in a numerical simulation on the basis of the travel state of the train at the time of passage of the step command start position such that the train can stop at the target stop position.

It should be noted that the deceleration command 23a may have a constant value until the train stops at the target stop position, or it may have a value that changes such that the braking force of the braking device 8 is gradually reduced as the train approaches the target stop position in consideration of ride comfort.

The deceleration command 23a can be expressed by one of the following expressions (1) and (2). The expression (1) is a function of the time that has elapsed since the point in time of the passage determination of the step command start position performed by the step command start position determining unit 22. The expression (2) is a function of the distance the train has traveled from train on-rail position at the point in time of the passage determination.

[Expression 1]

$$n = f(t, N, T) \quad (1)$$

[Expression 2]

$$n = f(x, N, X) \quad (2)$$

In the above-described expression (1), the reference character n represents a value of the deceleration command 23a to be output. The reference characters t, N and T, which are arguments of a function f in the above-described expression (1), represents the time that has elapsed from the point in time of the passage determination of the step command start position, a deceleration command array, and a command value change time array, respectively. Both of the deceleration command array and the command value change time array have a magnitude that is one pus the number of changes of the deceleration command 23a since the point in time of the passage determination of the step command start position. When the deceleration command 23a has not changed since the point in time of the passage determination of the step command start position, the magnitude is 1. When the deceleration command 23a has changed m times since the point in time of the passage determination of the step command start position, the magnitude is m+1. The reference character m is an integer of 1 or more.

In the above-described expression (2), the reference character n represents a value of the deceleration command 23a to be output. The reference characters x, N and X, which are arguments of a function f in the above-described expression (2), represent the travel distance of the train for which measurement has been started since the point in time of the passage determination of the step command start position, a deceleration command array, and a command value change distance array, respectively. Both of the deceleration command array and the command value change distance array have a magnitude that is one plus the number of changes of the deceleration command 23a since the point in time of the passage determination of the step command start position.

The function f in the above-described expression (2) is expressed by the following expression (3). The following expression (3) is described in the form that corresponds to the above-described expression (2), and the following expression (3) similarly corresponds to the above-described expression (1).

[Expression 3]

$$f(x, N, X) = \sum_{i=0}^{m-1} N_i \{U(x - X_i) - U(x - X_{i+1})\} + N_m U(x - X_m) \quad (3)$$

In the above-described expression (3), the reference character i is a variable that retrieves elements of the deceleration command array N and the command value change distance array X. Elements of the deceleration command array N and the command value change distance array X are represented by reference signs $N_i$ and $X_i$, respectively. The value at the time of the passage determination of the step command start position is represented by i=0. As the stop time of the train approaches, the reference character i is increased to satisfy i=m. In addition, the function U in the above-described expression (3) is a unit step function, and it is defined by the following expression (4).

[Expression 4]

$$U(p) = \begin{cases} 1 & (p \geq 0) \\ 0 & (p < 0) \end{cases} \quad (4)$$

The deceleration command 23a is generated by adding a modification amount to the initial deceleration command that is contained in a travel history selected on the basis of the travel state at the time of passage determination of the step command start position. The modification amount is calculated on the basis of the past travel states contained in the selected travel history. The relation between the initial deceleration command and the modification amount will be specifically described below with reference to FIGS. 3 and 4.

Figure 3:
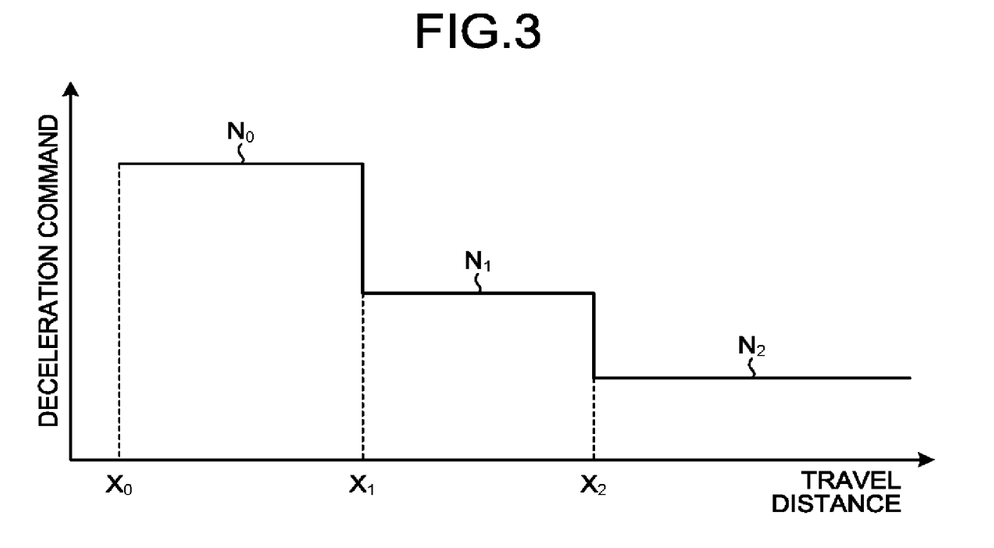
FIG. 3 is a diagram illustrating one example of an initial deceleration command preset in a travel history storage unit illustrated in FIG. 1.

FIG. 3 is a diagram illustrating one example of the initial deceleration command preset in the travel history storage unit 24 illustrated in FIG. 1. In FIG. 3, the vertical axis represents a deceleration command and the horizontal axis represents the travel distance of a train. The initial deceleration command is set to a value corresponding to the travel distance. Although the deceleration command of m=2 is exemplified in FIG. 3, the value of the deceleration command is not limited to the illustrated example. The reference sign $X_0$ corresponds to the travel distance at the time of passage determination of the step command start position. The deceleration command $N_0$ is output between the travel distance $X_0$ and the travel distance $X_1$. The deceleration command $N_1$ is output between the travel distance $X_1$ and the travel distance $X_2$. The deceleration command $N_2$ is output between the travel distance $X_2$ and the distance where the train stops. The deceleration command array N and the command value change distance array X in FIG. 3 are expressed by expressions (5) and (6), respectively.

[Expression 5]

$$N=[N_0 \, N_1 \, N_2] \quad (5)$$

[Expression 6]

$$X=[X_0 \, X_1 \, X_2] \quad (6)$$

Figure 4:
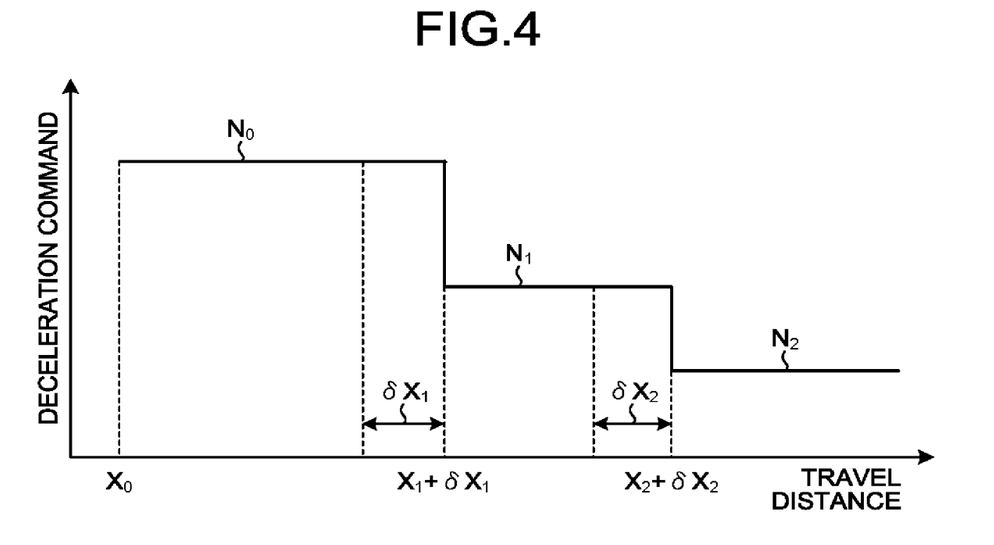
FIG. 4 is a diagram illustrating one example of a modification amount for the initial deceleration command illustrated in FIG. 3.

FIG. 4 is a diagram illustrating one example of the modification amount for the initial deceleration command illustrated in FIG. 3. In FIG. 4, the vertical axis represents the deceleration command and the horizontal axis represents the travel distance of the train. In FIG. 4, a deceleration command of m=2 is exemplified as in FIG. 3. The deceleration command illustrated in FIG. 4 is obtained by adding the modification amount to the initial deceleration command illustrated in FIG. 3. The reference sign $X_0$ corresponds to the travel distance at the time of passage determination of the step command start position. Reference signs $\delta X_1$ and $\delta X_2$ are modification amounts. The deceleration command $N_0$ is output between the travel distance $N_0$ and the travel distance $X_1+\delta X_1$. The deceleration command $N_1$ is output between the travel distance $X_1+\delta X_1$ and the travel distance $X_2+\delta X_2$. The deceleration command $N_2$ is output between the travel distance $X_2+\delta X_2$ and the distance where the train stops.

In the modified deceleration command $N_0$ illustrated in FIG. 4, the travel distance at which the deceleration command changes from the deceleration command $N_0$ to the deceleration command $N_1$ is delayed by the travel distance $\delta X_1$ when compared with the case of the initial deceleration command $N_0$ illustrated in FIG. 3. In addition, in the modified deceleration command $N_1$ illustrated in FIG. 4, the travel distance at which the deceleration command changes from the deceleration command $N_1$ to the deceleration command $N_2$ is delayed by the travel distance $\delta X_2$ when compared with the case of the initial deceleration command $N_1$ illustrated in FIG. 3.

Here, a deceleration command n' after modification of an initial deceleration command n is expressed by the following expression (8) by specifying a modification amount array $\delta X$ as shown in the following expression (7).

[Expression 7]

$$\delta X=[0 \, \delta X_1 \, \delta X_2] \quad (7)$$

[Expression 8]

$$n'=f(x, N, X+\delta X) \quad (8)$$

The deceleration command generating unit 23 calculates the modification amount array δX in the above-described expression 7), calculates the modified deceleration command n' by modifying the initial deceleration command n with the modification amount array δX, and outputs the modified deceleration command n' as the deceleration command 23a illustrated in FIG. 1.

Figure 5:
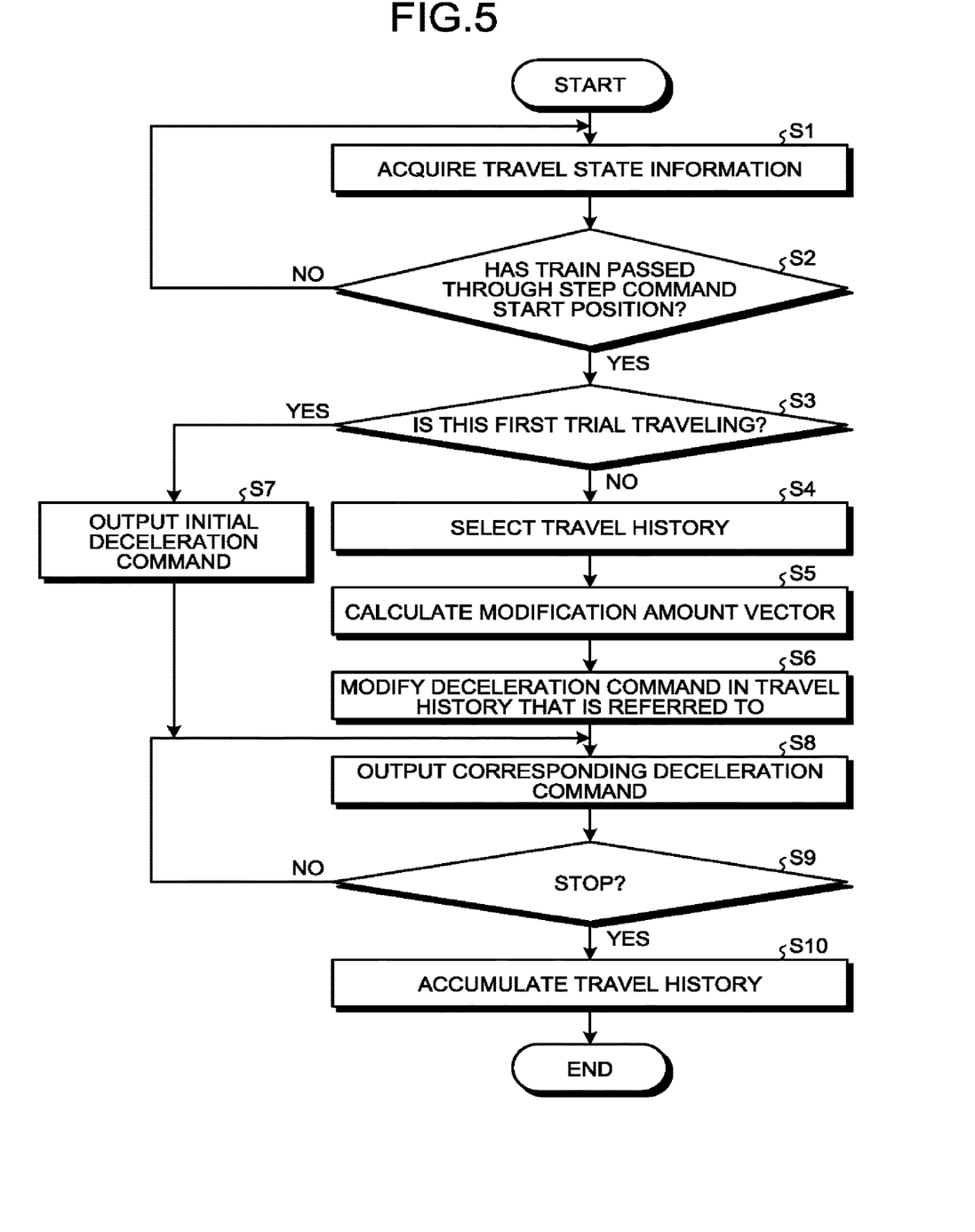
FIG. 5 is a flowchart illustrating operation of the automatic train operation device according to the first embodiment of the present invention.

FIG. 5 is a flowchart illustrating operation of the automatic train operation device 2-1 according to the first embodiment of the present invention. The step command start position determining unit 22 and the deceleration command generating unit 23, which have started processing, acquire the travel state information 21a at the current time (S1).

The step command start position determining unit 22 determines whether the train has passed through the step command start position a certain distance before a preset target stop position on the basis of the acquired travel state information 21a (S2).

When the train has not passed through the step command start position (S2, No), the step command start position determining unit 22 repeats the processing at the steps S1 and S2.

When the train has passed through the step command start position (S2, Yes), the step command start position determining unit 22 outputs the position passage information 22a. The deceleration command generating unit 23 that has received the position passage information 22a determines whether this is the first trial traveling on the basis of the travel history 24a stored in the travel history storage unit 24 (S3).

Examples of the travel history 24a corresponding to the current travel state can include the initial deceleration command and a plurality of deceleration commands 23a. The initial deceleration command is preset before the trial traveling of the train. The deceleration commands 23a are stored during past trial traveling of the train. Examples of the deceleration commands 23a stored during trial traveling of the train can include the deceleration command 23a generated by the deceleration command generating unit 23 during the first trial traveling and can include the deceleration commands 23a generated by the deceleration command generating unit 23 during each of the second and subsequent trial travelings.

Figure 6:
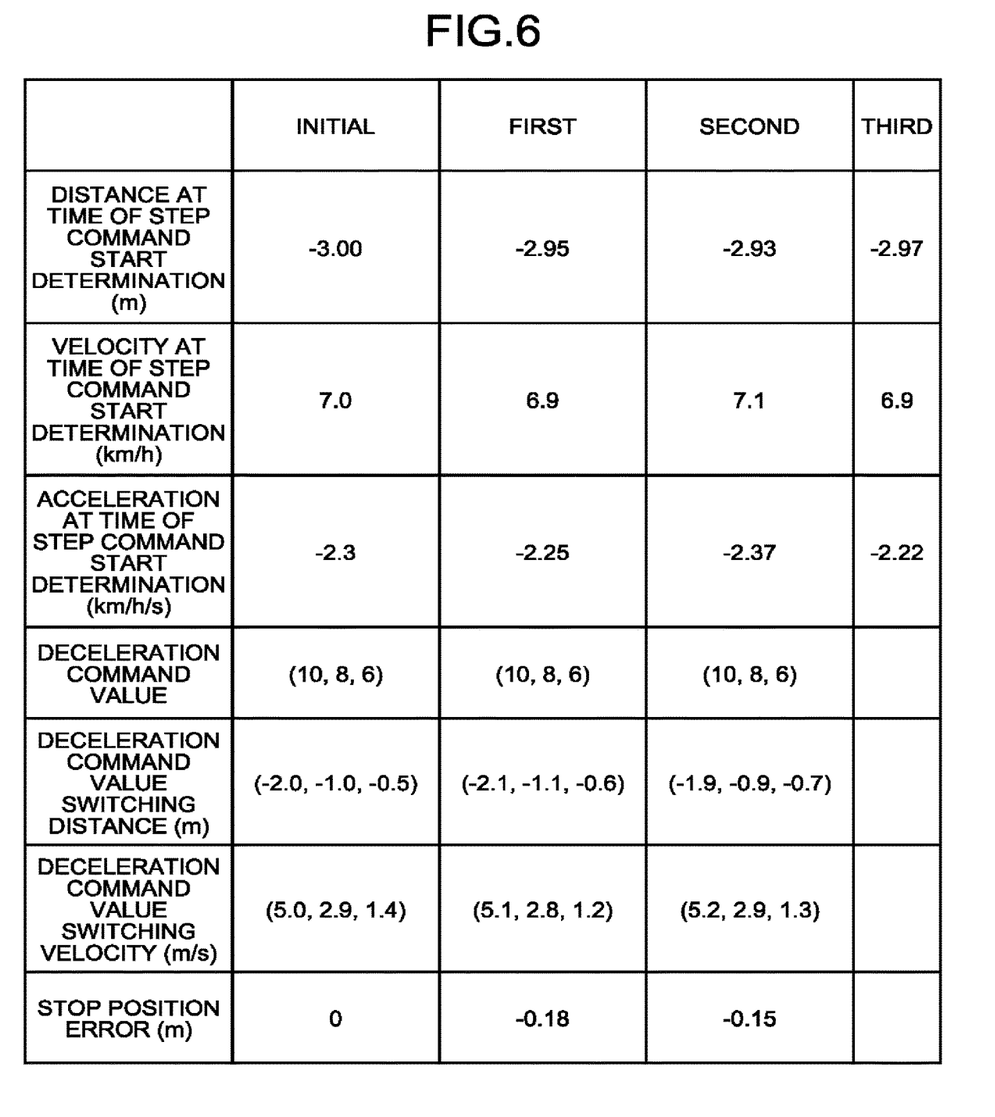
FIG. 6 is a diagram illustrating one example of a travel history corresponding to a current travel state.

FIG. 6 illustrates one example of the travel history 24a corresponding to the current travel state. FIG. 6 illustrates one example of the travel history 24a at the moment when the train enters the step command start position during each of the initial to third trial travelings. The distance at the time of the step command start determination, the velocity at the time of the step command start determination, and the acceleration at the time of the step command start determination illustrated in FIG. 6 respectively represent the distance [m] from the target stop position, the train velocity [km/h], and the train acceleration [km/h/s] at the time when the train is determined to have passed through the step command start position. The deceleration command value, the deceleration command value switching distance, and the deceleration command value switching velocity illustrated in FIG. 6 respectively are the deceleration command array N, the distance [m] from a target position at the time of switching of the deceleration command, and the train velocity [km/h] at the time of switching of the deceleration command. Any array number has a magnitude that is one plus the number of switchings of the deceleration command: m+1. The stop position error illustrated in FIG. 6 is a distance [m] from the target position at the time of detection of the stopping of the train in each trial traveling. That is, the stop position error is a distance from a position where the train has stopped to the target stop position in each trial traveling. In the travel history 24a, the data increases by one row for each trial traveling.

In the case of the first trial traveling (S3, Yes), the deceleration command generating unit 23 that has acquired the travel history 24a sets the initial deceleration command as the deceleration command 23a to be output to the braking command output unit 25 (S7).

In the case of the second and subsequent trial travelings (S3, No), the deceleration command generating unit 23 selects one travel history to be referred to from the travel histories 24a (S4) by comparing the travel histories 24a acquired up until the previous time with the travel state information 21a at the time of this passage determination.

Specifically, the deceleration command generating unit 23 sets at least one comparison target of a travel position, a travel velocity, and a deceleration as a set comparison target. In relation to the set comparison target, the deceleration command generating unit 23 compares values of corresponding set comparison targets at the passage determinations stored in the travel histories 24a with the set comparison target at the passage determination during the current trial traveling. The deceleration command generating unit 23 is then only required to select a travel history having the smallest error in an absolute value in the case of one set comparison target, and it is only required to select a travel history having the smallest total of errors in an absolute value in the case of a plurality of set comparison targets. In the case where there are a plurality of travel histories in which the absolute value of an error of the value of the set comparison target is the same, the deceleration command generating unit 23 may also select a travel history having the smallest stop position error. In such a way, the deceleration command generating unit 23 selects a travel history closest to the travel state of the train at the time when the train has passed through the step command start position. In addition, the deceleration command generating unit 23 can assume that the train decelerates at a constant deceleration until stopping, estimate the stop position errors in each travel history and the current trial traveling, and compare the estimated value of the stop position error in each travel history with the estimated value of the stop position error in the current trial traveling by using the distance, velocity, and acceleration at the time of passage determination. The deceleration command generating unit 23 can then select a travel history having the smallest error.

In the third trial traveling, that is, the trial traveling at this time, a value of travel history data selected during selection of the travel history data, for example, (10, 8, 6) is input in the column of the deceleration command value. In the third trial traveling, the switching distance in the trial traveling at this time is calculated by using the selected travel history data. The calculated result is used for the timing of switching of the deceleration command value in the trial traveling at this time. The switching distance and the switching velocity at the time when the deceleration command value is eventually switched are recorded in the travel history data. In addition, the stop position error is set after the stop of the train is detected in the third trial traveling.

The deceleration command generating unit 23 then calculates the modification amount array δX of the deceleration command by using the stop position error of the selected travel history (S5). The relational expression of each component of the modification amount array δX is expressed by the following expression (9) by using a train velocity V0 at the passage determination in the travel history selected in the processing (S4), a stop position error L, and a current train velocity V1.

[Expression 9]

$$\sum_{i=1}^{m}(N_{i-1}-N_i)\delta X_i = N_m \cdot L - \frac{V_1^2}{2} + \frac{V_0^2}{2} \qquad (9)$$

In express (9), the reference character m means the number of switchings of a command value. In addition, the conditional expression of each component of the modification amount array δX is expressed by the following expression (10).

[Expression 10]

$$X_0 < X_1 + \delta X_1 < X_2 + \delta X_2 < \ldots < X_m + \delta X_m \qquad (10)$$

The expression (10) prevents misalignment of a modified switching position of the deceleration command, and ensures that the k (k=1, 2, 3, ..., m−1)-th switching is performed before the k+1-th switching. Each component of the modification amount array δX is only required to be selected from combinations satisfying the expressions (9) and (10). For example, when the modification amounts of the modification amount array δX are the same (δX_1=δX_2= ... =δX_m=E), setting can be performed without the expression (10) being taken into consideration because the reference character E is given by the following expression (11) and each switching position of the deceleration command is changed by an equivalent distance.

[Expression 11]

$$E = \frac{N_m \cdot L - \frac{V_1^2}{2} + \frac{V_0^2}{2}}{\sum_{i=1}^{m}(N_{i-1}-N_i)} \qquad (11)$$

In addition, each component of the modification amount array δX is only required to be calculated, for example, such that the conditional expressions (9) and (10) are satisfied, the train is switched from the step command start position to the stop, and the proportion of the output distance of each deceleration command is closest to the proportion of equal divisions. In such a case, the ideal equally-divided distance is X0/(m+1). An evaluation function is set such that the evaluation function minimizes the difference of the modified deceleration command switching position from the ideal equally-divided distance. In such a way, the modification amount array δX can be uniquely solved as a solution of a quadratic programming problem.

The deceleration command generating unit 23 modifies the deceleration command contained in the travel history 24a selected from the travel history storage unit 24 with the modification amount array δX to calculate the modified deceleration command n', and sets the modified deceleration command n' as the deceleration command 23a (S6). The deceleration command generating unit 23 outputs a deceleration command corresponding to the current travel position x in accordance with the set deceleration command 23a (S8). The braking command output unit 25 determines whether the train has stopped (S9). When the train has not stopped (S9, No), the braking command output unit 25 keeps outputting the braking command 2a corresponding to the current travel position x in accordance with the deceleration command 23a. When the braking command output unit 25 determines that the train has stopped (S9, Yes), the travel history storage unit 24 newly stores the travel history at this time (S10), and ends the processing.

Although, in the above description, a method of modifying the travel position x of the train with the modification amount array δX has been described, output time T of the command value may be modified by the modification amount array δT. In such a case, δT_i [s] corresponding to δX_i [m], which is an element of the obtained δX, may be converted by δT_i=δX_i/V_i. Note that the reference sign V_i is the velocity [m/s] at the switching of the i-th deceleration command.

The braking command output unit 25 generates the braking command 2a that is a notch command for causing the train velocity to follow the initial deceleration command before modification output from the deceleration command generating unit 23. The braking device 8 applies braking pressure corresponding to the braking command 2a to the wheel 4. The braking command output unit 25 also generates the braking command 2a that is a notch command for causing the train velocity to follow the deceleration command after modification output from the deceleration command generating unit 23. The braking device 8 applies braking pressure corresponding to the braking command 2a to the wheel 4 to decelerate the train.

As described above, the automatic train operation device 2-1 according to the first embodiment modifies the deceleration command 23a on the basis of the past travel history 24a so as to automatically modify the stop position of the train. The automatic train operation device 2-1 can thus reduce the number of labor-hours needed for making an adjustment to modify stopping accuracy. In a conventional method in which braking characteristics are learned, a recorded braking characteristic model is adjusted to match true braking characteristics by learning the braking characteristics corresponding to the deceleration command during traveling of the train, whereby the accuracy of the stop position is improved. Under stop control, however, the train travels at, for example, 10 [km/h] that is lower than 40 [km/h] to 70 [km/h] during ordinary traveling, and thus the friction coefficient between a wheel that generates a braking force and a brake shoe is higher than that during the ordinary traveling. As a result, in the conventional method in which braking characteristics are learned, the braking characteristics estimated during the ordinary traveling are different from the braking characteristics under the stop control. The conventional method in which braking characteristics are learned may cause an error related to the stop position. In addition, the velocity sensor 5 mounted in the train measures velocity by using the electromotive force generated during rotation of the wheel 4. When the wheel 4 has a low velocity, i.e., the wheel 4 rotates slowly, the electromotive force is small. Consequently, the accuracy of the measured velocity may be lowered. For this reason, it is difficult to learn braking characteristics from the past travel state in a low velocity region. The conventional method in which braking characteristics are learned may fail to enhance the accuracy in the stop position.

In contrast, the stop position in the travel history recorded when the train stops at the target stop position and the stop position at the time when the train actually stops are similar in the velocity zone of the train, the travel section of the train, and the history of the deceleration command 23a. The automatic train operation device 2-1 according to the first embodiment generates the deceleration command 23a by using such a stop position in a travel history, and thus it has high reproducibility of the stop result. Thus, the automatic train operation device 2-1 can enhance the accuracy of the stop position compared with the conventional method in which braking characteristics are learned. In addition, the automatic train operation device 2-1 according to the first embodiment does not change the number of switchings of the deceleration command value, and thus the number of switchings of the notch command is not increased, and thus ride comfort is not deteriorated.

Second Embodiment

Figure 7:
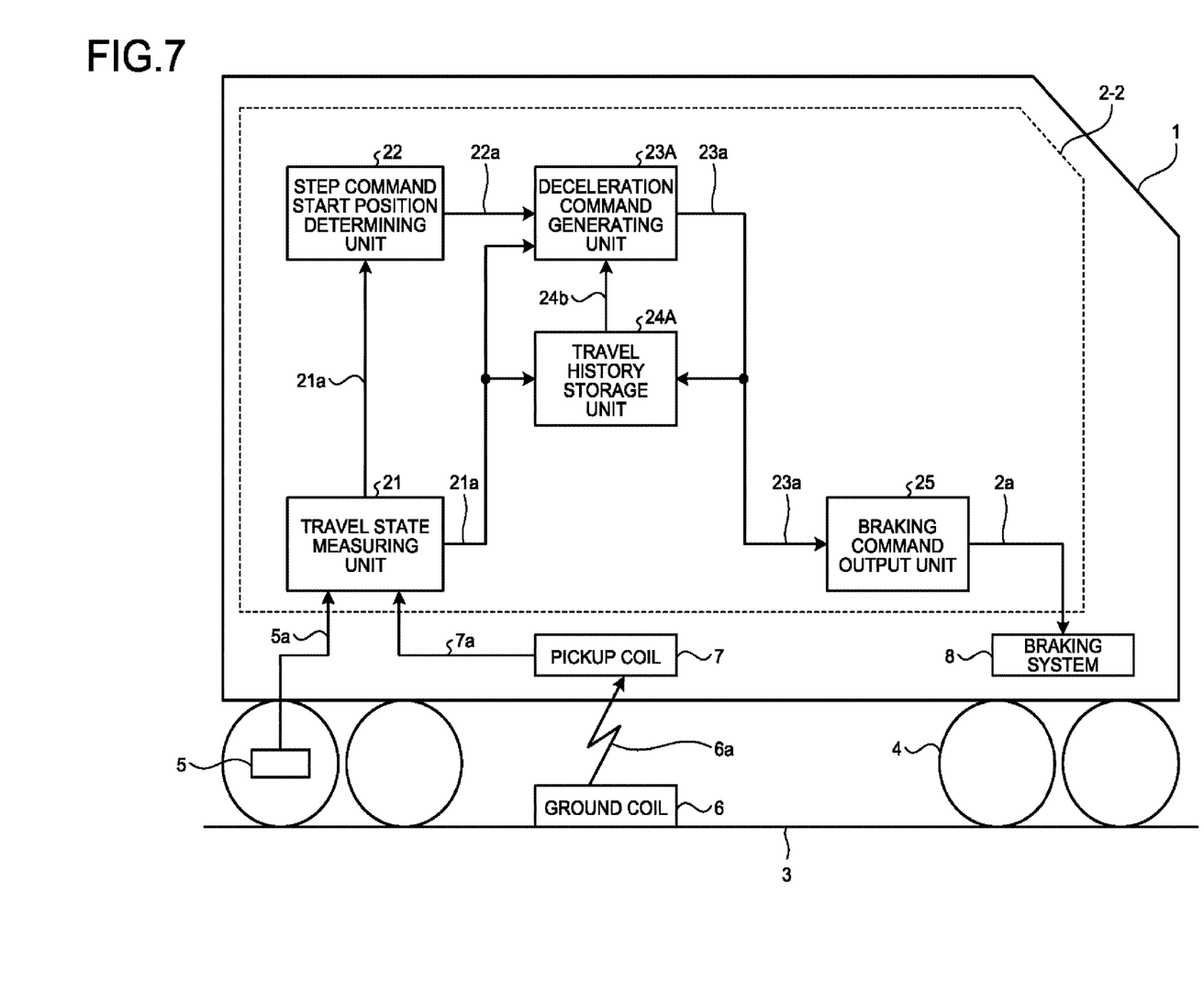
FIG. 7 is a diagram schematically illustrating a train car on which an automatic train operation device according to a second embodiment of the present invention is mounted.

FIG. 7 is a diagram schematically illustrating a train car on which an automatic train operation device 2-2 according to a second embodiment of the present invention is mounted. The same reference symbols are given to the same parts as the parts in the first embodiment and description of these parts is omitted below, with only different parts being described here.

The automatic train operation device 2-2 of the second embodiment includes a deceleration command generating unit 23A instead of the deceleration command generating unit 23 of the first embodiment and a travel history storage unit 24A instead of the travel history storage unit 24.

The travel history storage unit 24A stores a travel history 24b. The deceleration command generating unit 23A receives the travel state information 21a, the position passage information 22a, and the travel history 24b, and it outputs the deceleration command 23a to the braking command output unit 25.

In addition to the travel history 24a described in the first embodiment, the travel history storage unit 24A stores, as the travel history 24b, at least one of travel environment, acceleration of the train, the deceleration command 23a output last time, the output duration time of the deceleration command 23a output last time, train occupancy, travel mode of the train, and the outside air temperature.

Examples of data relating to the travel environment can include (A) travel gradient data, (B) train travel mode including weather, (C) train occupancy, (D) outside air temperature, (E) a command value at the time when the train is determined to have passed through the step command start position, and (F) travel curvature data. These pieces of data (A) to (F) are elements that fluctuate traveling of the train. These pieces of data (A) to (F) are classified as a "travel history class". The travel mode represents a plurality of train control guidelines. Examples of the travel mode can include an energy-saving travel mode, a recovery operation mode, and a reduced velocity travel mode. The energy-saving travel mode is a mode in which the train is mainly in a coasting operation during traveling. In the recovery operation mode, when an operation schedule is delayed, accelerating operation is performed to return the operation schedule to an ordinary state, i.e., reduction in travel time is emphasized. The reduced velocity travel mode is adopted when braking performance deteriorates due to bad weather, for example, rain.

Figure 8:
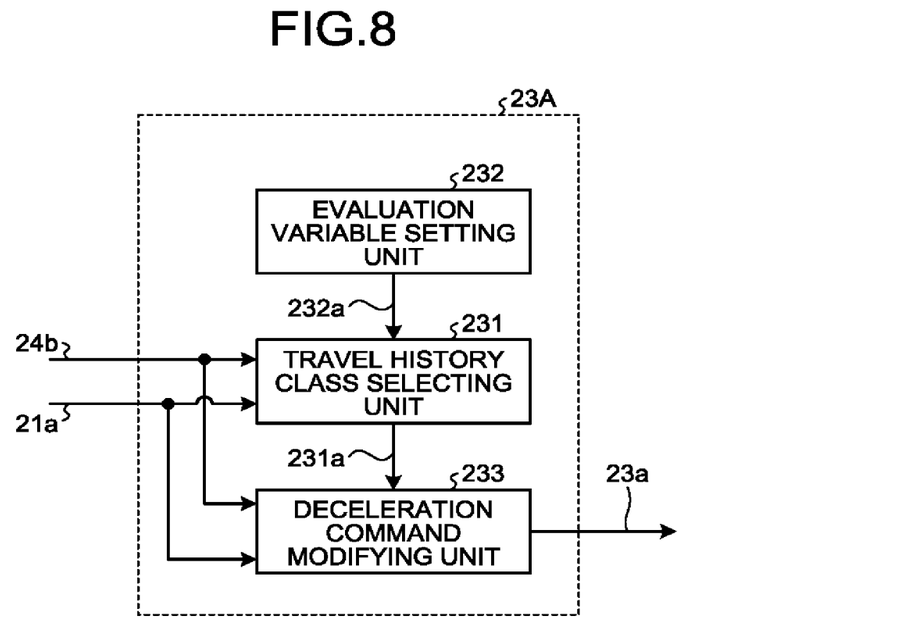
FIG. 8 is a diagram illustrating an example configuration of a deceleration command generating unit illustrated in FIG. 7.

FIG. 8 is a diagram illustrating an example configuration of the deceleration command generating unit illustrated in FIG. 7. The deceleration command generating unit 23A illustrated in FIG. 8 includes a travel history class selecting unit 231, an evaluation variable setting unit 232, and a deceleration command modifying unit 233. The travel history class selecting unit 231 selects a travel history class 231a. The travel history class 231a is a travel variable element indicating at least one of the travel gradient data, the train travel mode including weather, the train occupancy, the outside air temperature, the command value at the time when the train is determined to have passed through the step command start position, and the travel curvature data. The evaluation variable setting unit 232 sets an evaluation variable 232a for selecting the travel history class 231a. The deceleration command modifying unit 233 selects a plurality of travel histories 24b of the corresponding travel history class on the basis of the travel history class 231a from the travel histories 24b, and it modifies the deceleration command with the selected travel histories 24b.

Figure 9:
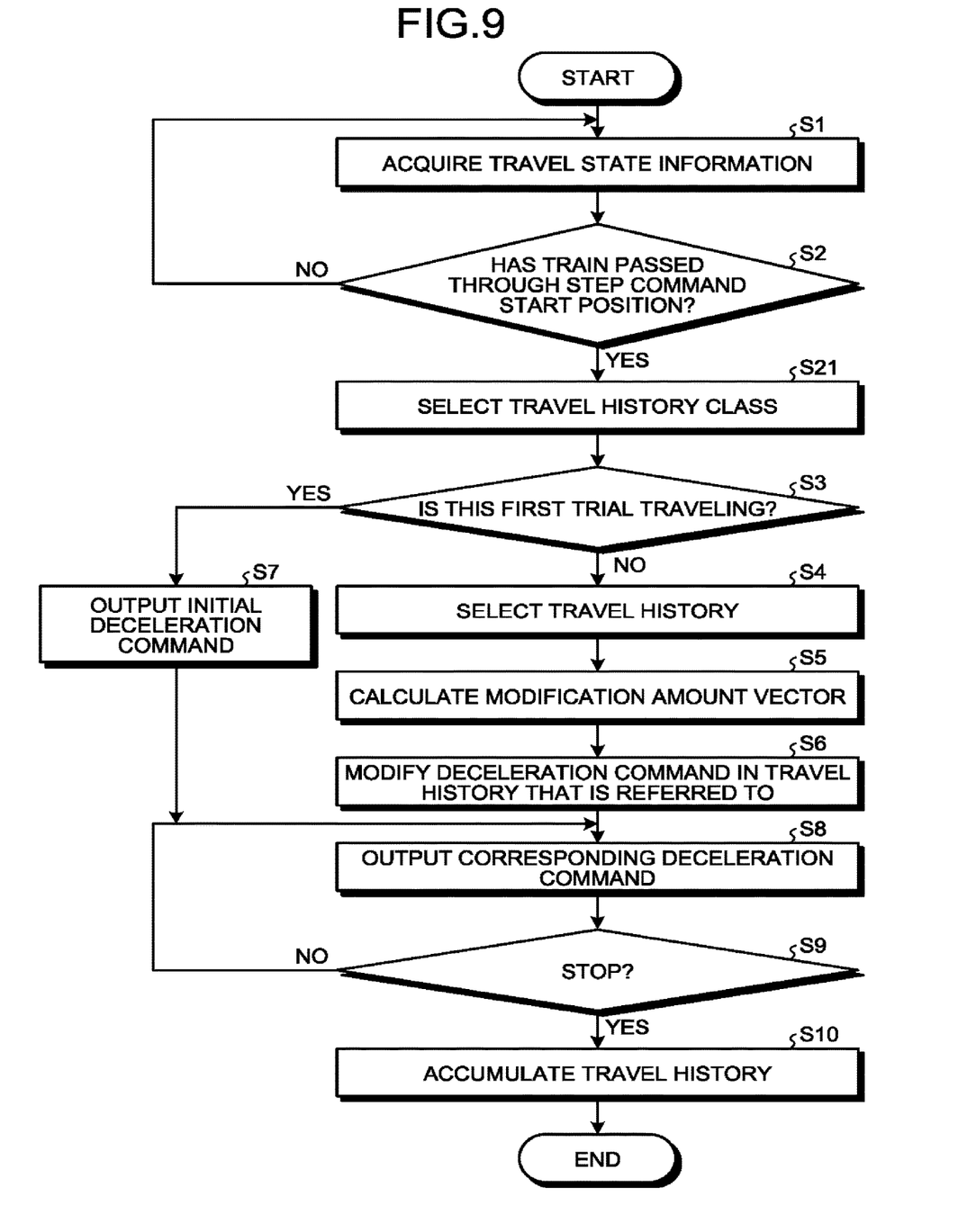
FIG. 9 is a flowchart illustrating operation of the automatic train operation device according to the second embodiment of the present invention.

FIG. 9 is a flowchart illustrating an operation of the automatic train operation device according to the second embodiment of the present invention. The difference from the flowchart illustrated in FIG. 5 is that S21 is added between S2 and S3 in the flowchart illustrated in FIG. 9. First, the automatic train operation device 2-2 according to the second embodiment extracts and selects a travel history whose travel environment matches from the travel history class for each of the travel histories stored in the travel history storage unit on the basis of the travel state at the time when the train has passed through the step command start position and on the basis of the travel history class. The automatic train operation device 2-2 then selects a past travel history to be referred to in order to modify the deceleration command in association with the extracted and selected travel history (S21). That is, a travel history analogous with the current travel environment and travel state is referred to from the travel histories stored in the past. Consequently, the deceleration command can be modified by using only the travel history close to the current trial traveling by extracting the past travel history analogous with the current travel environment. This is in contrast to the case where the deceleration command is modified by using all the travel histories stored in the travel history storage unit on the basis of only the travel state of the train. A stop command with a smaller stop control error than that in the first embodiment can thus be obtained.

Third Embodiment

Figure 10:
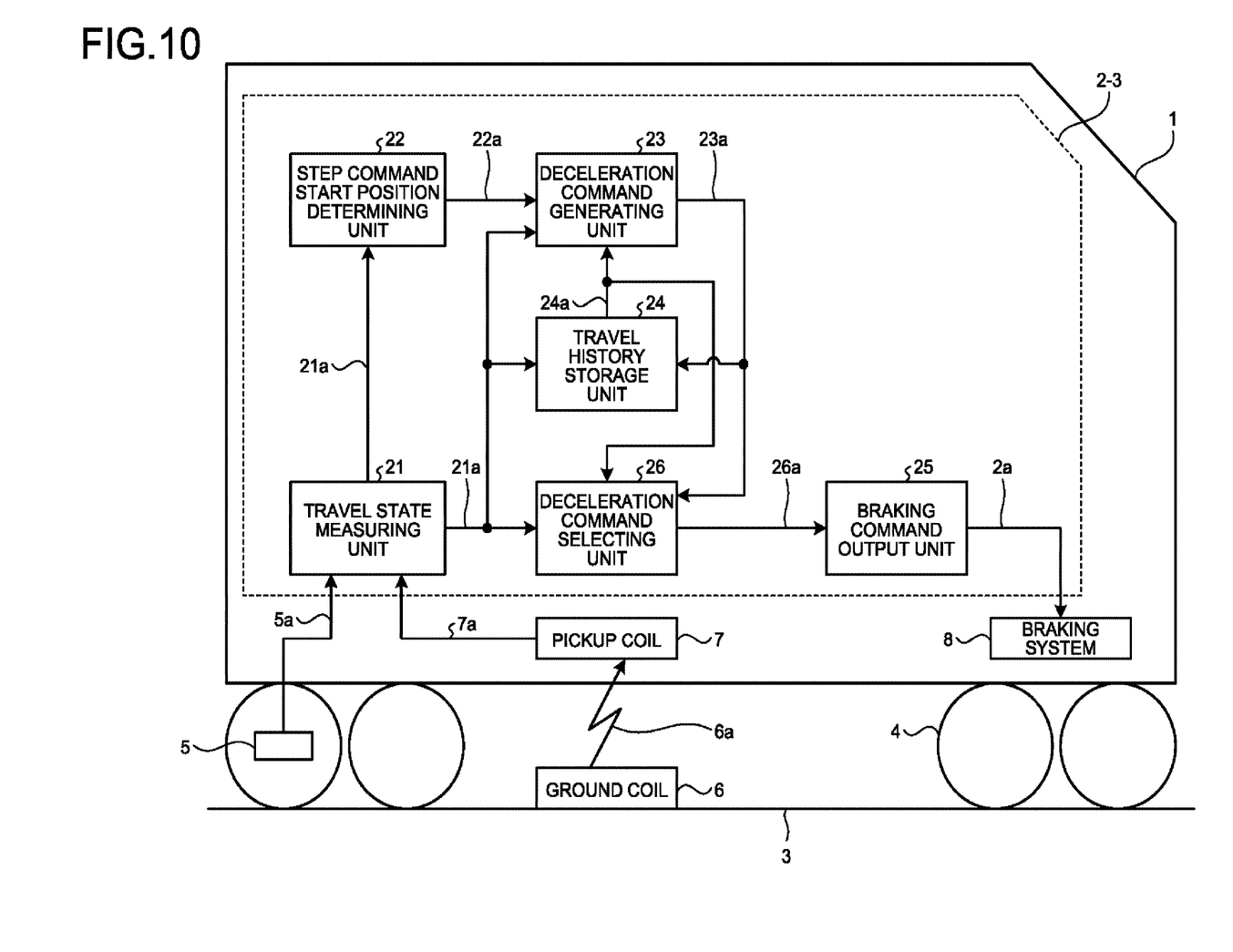
FIG. 10 is a diagram schematically illustrating a train car on which an automatic train operation device according to a third embodiment of the present invention is mounted.

FIG. 10 is a diagram schematically illustrating a train car on which an automatic train operation device 2-3 according to a third embodiment of the present invention is mounted. The same reference symbols are given to the same parts as the parts in the first embodiment and description of these parts is omitted below, with only different parts being described here.

In addition to the configuration of the first embodiment, the automatic train operation device 2-3 of the third embodiment includes a deceleration command selecting unit 26 that is a deceleration command output determining unit. The deceleration command selecting unit 26 receives the travel state information 21a, the deceleration command 23a, and the travel history 24a. The deceleration command selecting unit 26 selects one of the deceleration command 23a output from the deceleration command generating unit 23 and a deceleration command newly generated on the basis of the travel state information 21a, and it outputs a selected deceleration command 26a to the braking command output unit 25. The braking command output unit 25 outputs the braking command 2a corresponding to the received deceleration command 26a.

One example of a selecting operation in the deceleration command selecting unit 26 will he described here. The deceleration command selecting unit 26 determines the difference between the train position in the travel state contained in the travel history 24a that is selected by the deceleration command generating unit 23 and the train position contained in the current travel state information 21a output from the travel state measuring unit 21 when the travel history 21a is selected by the deceleration command generating unit 23. When the absolute value of the difference is within a specific threshold value, the deceleration command selecting unit 26 selects the deceleration command 23a output from the deceleration command generating unit 23.

To obtain the deceleration command generated by using the travel state information 21a, it is sufficient if the deceleration command corresponding to a required deceleration β[km/h/m] at the time of stopping the train at a constant deceleration until the train stops at the target stop position is calculated on the basis of the current train position and the train velocity. The required deceleration β is expressed by the following expression (12) by using a remaining travel ante D [m], which is the distance to the target stop position, and the current train velocity V [km/h].

[Expression 12]

$$\beta = \frac{V^2}{7.2 \cdot D} \quad (12)$$

When the deceleration command 23a is output and the travel state of the train is greatly deviated from the travel state described in the travel history 24a, the automatic train operation device 2-3 according to the third embodiment stops outputting the deceleration command 23a and outputs the deceleration command value corresponding to the required deceleration β. That is, the automatic train operation device 2-3 according to the third embodiment includes the deceleration command selecting unit 26 that functions as the deceleration command output determining unit that monitors the deviation of the current travel state from the past travel state and determines whether to continue outputting the deceleration command 23a. Even when the state is one that the automatic train operation device 2-3 does not expect to occur, the accuracy of the stop position can thus be increased.

It should be noted that the deceleration command selecting unit 26 of the third embodiment can also be applied to the automatic train operation device 2-2 according to the second embodiment. Furthermore, in the first to third embodiments, examples in which a travel history for each trial traveling is stored in the travel history storage unit are illustrated. The travel history storage unit, however, stores travel histories having an old storage date. The travel history storage unit may automatically delete a travel history that was stored a certain period before the present time. As a result, even when the braking characteristics change due to secular change of the braking device 8 as usage time increases, the deceleration command 23a can be modified by using a chronologically new travel history of a plurality of travel histories that reflect the braking characteristics. Consequently, in addition to the accuracy of the stop position being enhanceable compared with the case where the deceleration command 23a is modified by using all the travel histories without deleting a travel history, an inexpensive storage device can be used as the travel history storage unit 24 because the storage capacity of the travel history storage unit 24 can be more effectively used, whereby the manufacturing cost of the automatic train operation device 2-3 can be reduced.

The configurations illustrated in the above embodiments describe examples of an aspect of the present invention. The configurations can be combined with another known technique, and part of the configurations can be omitted or changed without departing from the spirit of the present invention.

REFERENCE SIGNS LIST 1 car; 2-1, 2-2, 2-3 automatic train operation device; 2a braking command; 3 rail; 4 wheel; 5 velocity sensor; 5a velocity information; 6 ground coil; 6a ground coil information; 7 pickup coil; 7a ground coil detection information; 6 braking device; 21 travel state measuring unit; 21a travel state information; 22 step command start position determining unit; 22a position passage information; 23, 23A deceleration command generating unit; 23a, 26a deceleration command; 24, 24A travel history storage unit; 24a, 24b travel history; 25 braking command output unit; 26 deceleration command selecting unit; 231 travel history class selecting unit; 231a travel history class; 232 evaluation variable setting unit; 232a evaluation variable; 233 deceleration command modifying unit.

The invention claimed is:

1. An automatic train operation device for performing stop control on a train, comprising:
    a determiner to determine whether the train passes through a step command start position that is a position a certain distance before a target stop position of the train;
    a deceleration command generator to generate a deceleration command to control a braking force of the train in a section from the step command start position that the train passes through to the target stop position at which the train stops; and
    a travel history storage to store a travel state of the train and the deceleration command for the section as a plurality of travel histories, wherein,
    when the step command start position is determined by the determiner, the deceleration command generator generates the deceleration command by using the travel histories stored in the travel history storage.

2. The automatic train operation device according to claim 1, wherein
    the deceleration command generator selects one of the travel histories on a basis of a travel state of the train at a time when the train passes through the step command start position, and generates the deceleration command by modifying a deceleration command in the selected travel history.

3. The automatic train operation device according to claim 2, wherein the deceleration command generator selects the travel history containing a travel state closest to a travel state of the train at a time when the train passes through the step command start position.

4. The automatic train operation device according to claim 2, wherein the deceleration command generator generates the deceleration command by modifying timing of switching a deceleration command value in the selected travel history.

5. The automatic train operation device according to claim 4, wherein
    the travel history contains a stop position error that is a distance from a position where the train stops to the target stop position, and the deceleration command generator modifies the timing of switching the deceleration command value on a basis of the stop position error.

6. The automatic train operation device according to claim 1, wherein
the deceleration command generator includes:
an evaluation variable setter to set an evaluation variable for selecting a travel variable element that indicates at least one of travel gradient data, a train travel mode including weather, a train occupancy, outside air temperature, a command value at a time when it is determined that the train passes through the step command start position, and travel curvature data;
a selector to select a corresponding travel variable element on a basis of the evaluation variable from the travel histories; and
a deceleration command modifier to select a travel history corresponding to the travel variable element selected by the selector from the travel histories and to modify a deceleration command by using the selected travel history.

7. The automatic train operation device according to claim 1, further comprising a deceleration command output determiner to determine, by monitoring a deviation between the travel state in the section and the travel state stored in the travel history storage, whether to continue outputting the deceleration command to a braking device that generates the braking force.

8. The automatic train operation device according to claim 1, wherein the travel history storage deletes the travel history stored a certain period before.

* * * * *